(12) United States Patent
Ya

(10) Patent No.: US 7,205,474 B2
(45) Date of Patent: Apr. 17, 2007

(54) COMPUTER CASE STRUCTURE

(75) Inventor: Yun-Jie Ya, Taipei (TW)

(73) Assignee: Inventec Corporation, Taipei (TW)

( * ) Notice: Subject to any disclaimer, the term of this patent is extended or adjusted under 35 U.S.C. 154(b) by 25 days.

(21) Appl. No.: 11/113,239

(22) Filed: Apr. 25, 2005

(65) Prior Publication Data

US 2006/0238969 A1    Oct. 26, 2006

(51) Int. Cl.
*H05K 5/00* (2006.01)
*H05K 7/18* (2006.01)

(52) U.S. Cl. .................. 174/50; 174/520; 174/17 R; 361/683; 361/687; 361/695

(58) Field of Classification Search .............. 174/52.1, 174/16.3, 16.1, 50, 17 R, 480, 503, 520, 174/559, 58, 57, 135; 361/695, 687, 600, 361/683, 679, 676, 673, 694, 724, 725, 752, 361/796, 730, 728, 825; 211/26, 71.01
See application file for complete search history.

(56) References Cited

U.S. PATENT DOCUMENTS

| | | | | |
|---|---|---|---|---|
| 5,630,469 A | * | 5/1997 | Butterbaugh et al. ...... | 174/16.3 |
| 5,694,294 A | * | 12/1997 | Ohashi et al. .............. | 361/687 |
| 6,215,659 B1 | * | 4/2001 | Chen .......................... | 361/694 |
| 6,618,248 B1 | * | 9/2003 | Dalheimer ................... | 361/687 |
| 6,700,778 B1 | * | 3/2004 | Wang .......................... | 361/695 |
| 6,714,406 B2 | * | 3/2004 | Chen .......................... | 361/683 |
| 6,724,624 B1 | * | 4/2004 | Dodson ...................... | 361/695 |
| 6,866,577 B2 | * | 3/2005 | Gough et al. ............... | 361/695 |

* cited by examiner

*Primary Examiner*—Angel R. Estrada
(74) *Attorney, Agent, or Firm*—Rabin & Berdo, PC

(57) ABSTRACT

A computer case structure includes an anchor rack to hold and position a power supply. The anchor rack has force distributing walls extended from the periphery. When the computer case is positioned in a tilted manner, the weight of the power supply is evenly distributed by the force distributing walls to the computer case. The anchor rack thus formed can also prevent electromagnetic interference.

6 Claims, 5 Drawing Sheets

COMPUTER CASE STRUCTURE

FIELD OF THE INVENTION

The invention relates to a computer case structure for desktop computers, server hosts and the like, and particularly to a computer case structure to provide improved positioning for the power supply.

BACKGROUND OF THE INVENTION

With the advance of technology, development of computer related equipment has made great progress. Computer applications have also grown tremendously. They are now widely used in national defense and logistics, document exchange and file processing in enterprises, and personal applications. They are deeply woven into the lives of many people.

There are also many types of computers. In general, they can be classified as portable and stationary types. Notebook computers and personal digital assistants (PDA) are typical portable computers. Desktop computer and server hosts used by many enterprises are typical stationary computers.

In the stationary computer, a power supply is required to receive external electric power and transform to the electric power needed for operation of the computer equipment. Hence the power supply is an important device in the computer system. Refer to FIG. 1 for a conventional approach to installing a power supply on computer equipment.

The computer equipment generally includes electronic elements such as a mainboard, memory, central processing unit, various interface cards, data storage devices and the like. They are installed in a housing compartment 210 of a computer case 200. The computer case 200 has a rear side that usually has many first open areas 220 to connect to external electronic devices such as a display device, audio device, and the like. There is also a second open area 230 reserved for installation of a power supply 300. The conventional approach to installing the power supply 300 is to fasten an anchor board 400 on the computer case 200 and form a plurality of screw holes 240 around the second open area 230. The anchor board 400 is fastened to the computer case 200 by fastening screws 310 through the anchor board 400 and the screw holes 240. Then the power supply 300 is fastened to the computer case 200 by running screws 310 through the anchor board 400.

To enhance the fastening effect of the power supply 300, some anchor boards 400 have a bracing member 410 extended from one side to assist in holding the power supply 300.

While the conventional anchor board mentioned above can hold the power supply 300, with the constant advance of electronic elements in computer equipment, power requirements on the power supply 300 also increase. Nowadays, the specifications of 250 W, 300 W, or even 400 W and 500 W have been introduced. The size and weight of the power supply 300 increases constantly.

As a result, there are many concerns for the conventional computer case to support the power supply, notably:

1. Installation stability: The conventional design of the computer case 200 is inadequate to support the increasing size and weight of the power supply 300. Hence the power supply 300 cannot be installed steadily on the computer case 200.

2. Vibration and noise: As previously discussed, the weight of the power supply 300 is transferred to the computer case 200 through the screws 310. The screws 310 have to bear the weight and may fracture over a prolonged period of time. Moreover, even if high quality screws 310 are used, the screw holes 240 on the computer case 200 tend to warp and deform under the weight of the power supply 300. As a result, when the air fan of the power supply 300 is operating, vibration occurs and noise is generated. In serious situations, the access operation of the hard disk drives and optical disk drives could be affected.

3. Electro Magnetic interference (EMI): With the electric power of the power supply 300 increased, the EMI phenomenon also becomes more severe. Due to cost concerns, some manufacturers do not take proper protective measures. This affects the operation of other electronic elements of the computer equipment, or could even result in damage or malfunction of the computer equipment.

SUMMARY OF THE INVENTION

In view of the aforesaid problems, the invention aims to provide a computer case structure that is adaptable to a plurality of sizes and specifications of power supplies.

The computer case structure according to the invention has a housing compartment and an anchor rack located in the housing compartment to hold a power supply in the housing compartment. The anchor rack has force distributing walls extended from the periphery in the direction of the housing compartment to cover a portion of the power supply. The force distribution walls have a bent clipping section on a tail end. Hence different sizes of power supplies may be held securely through the anchor rack on the computer case. Whether the computer case is positioned horizontally, vertically or in a tilted manner, the force distributing walls can distribute the weight of the power supply to the computer case. In addition, the force distribution walls can shield EMI to maintain normal operation of the computer equipment.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
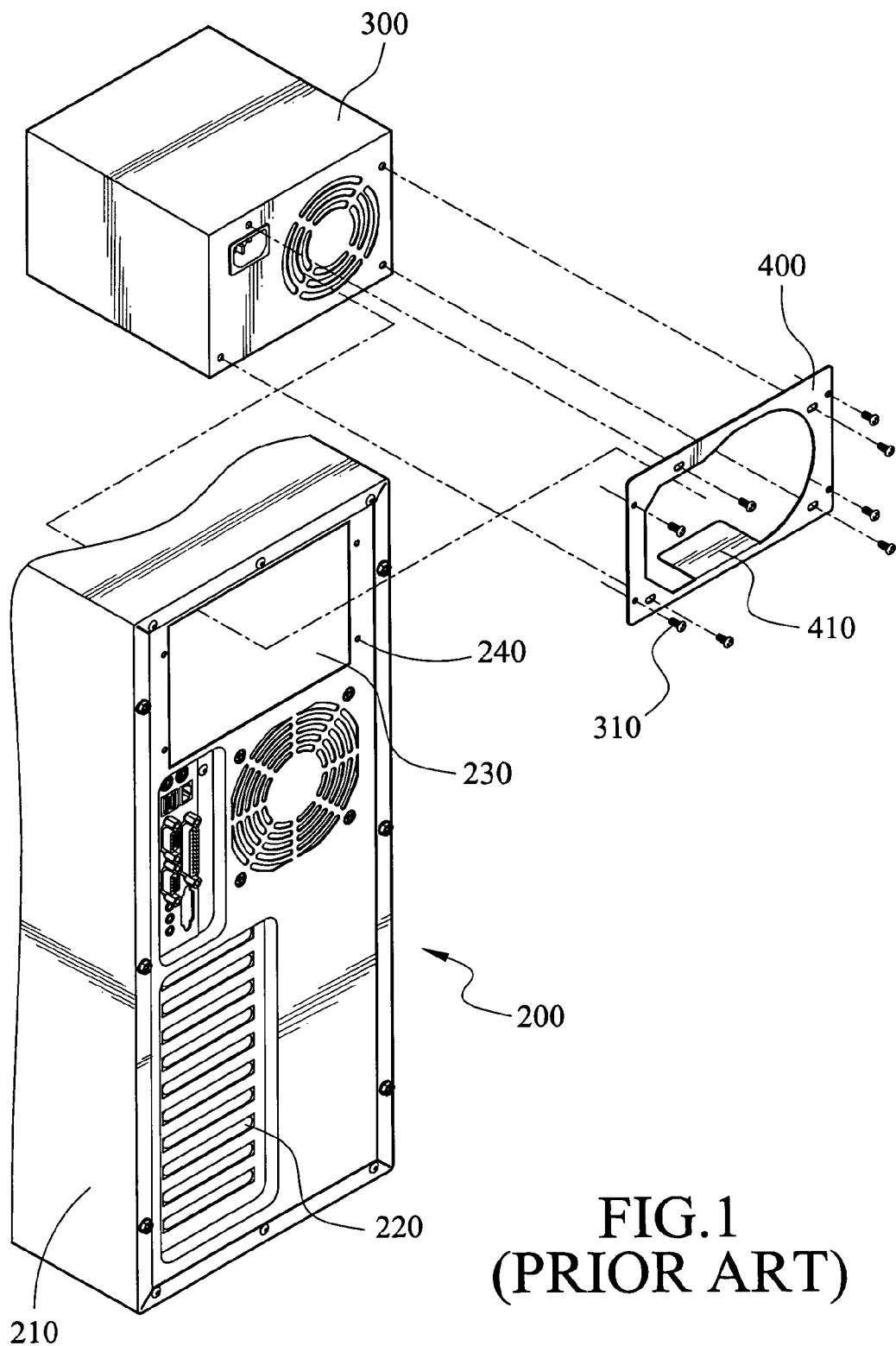
FIG. 1 is an exploded view of a conventional computer case.
Figure 2:
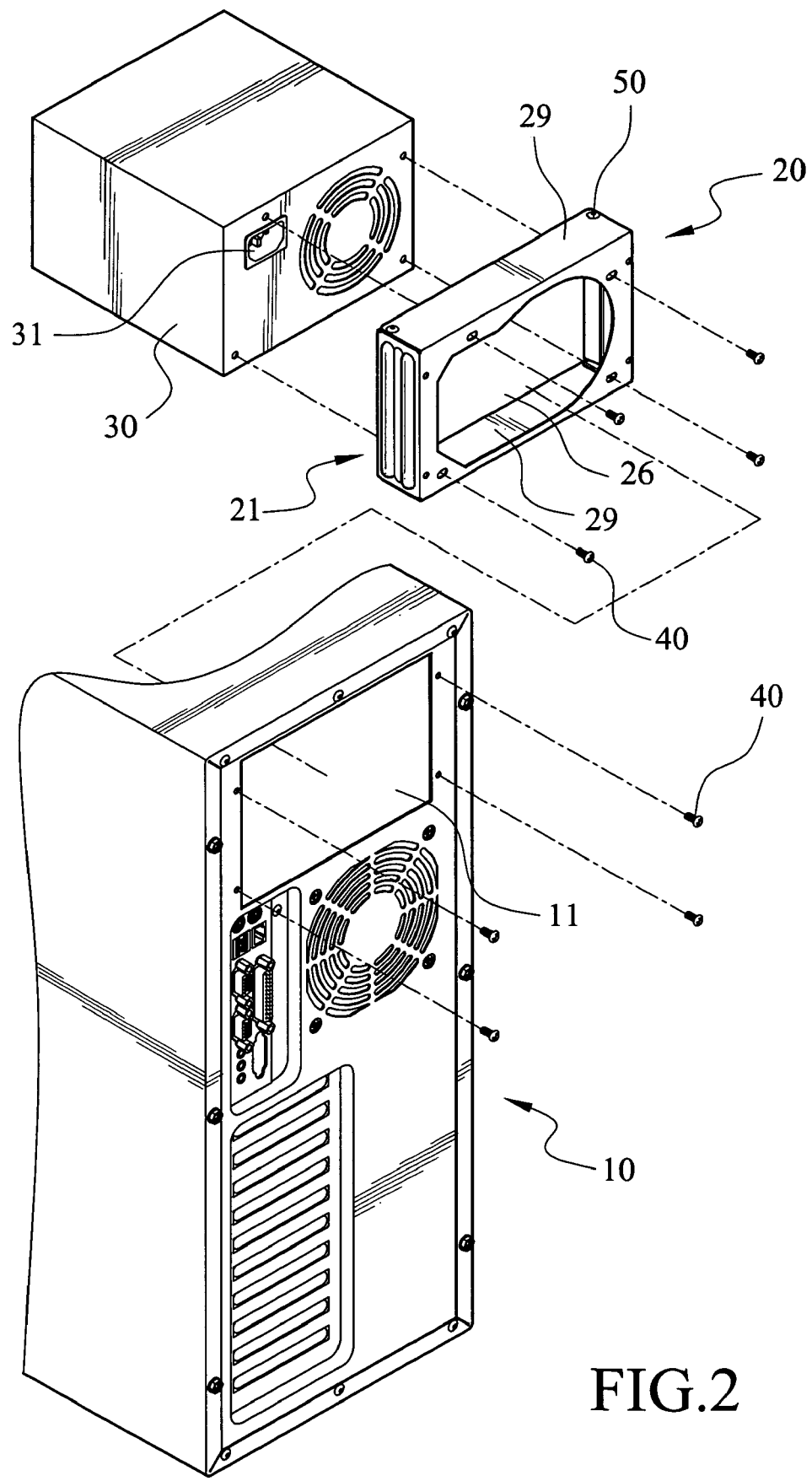
FIG. 2 is an exploded view of the computer case structure of the invention.
Figure 3:
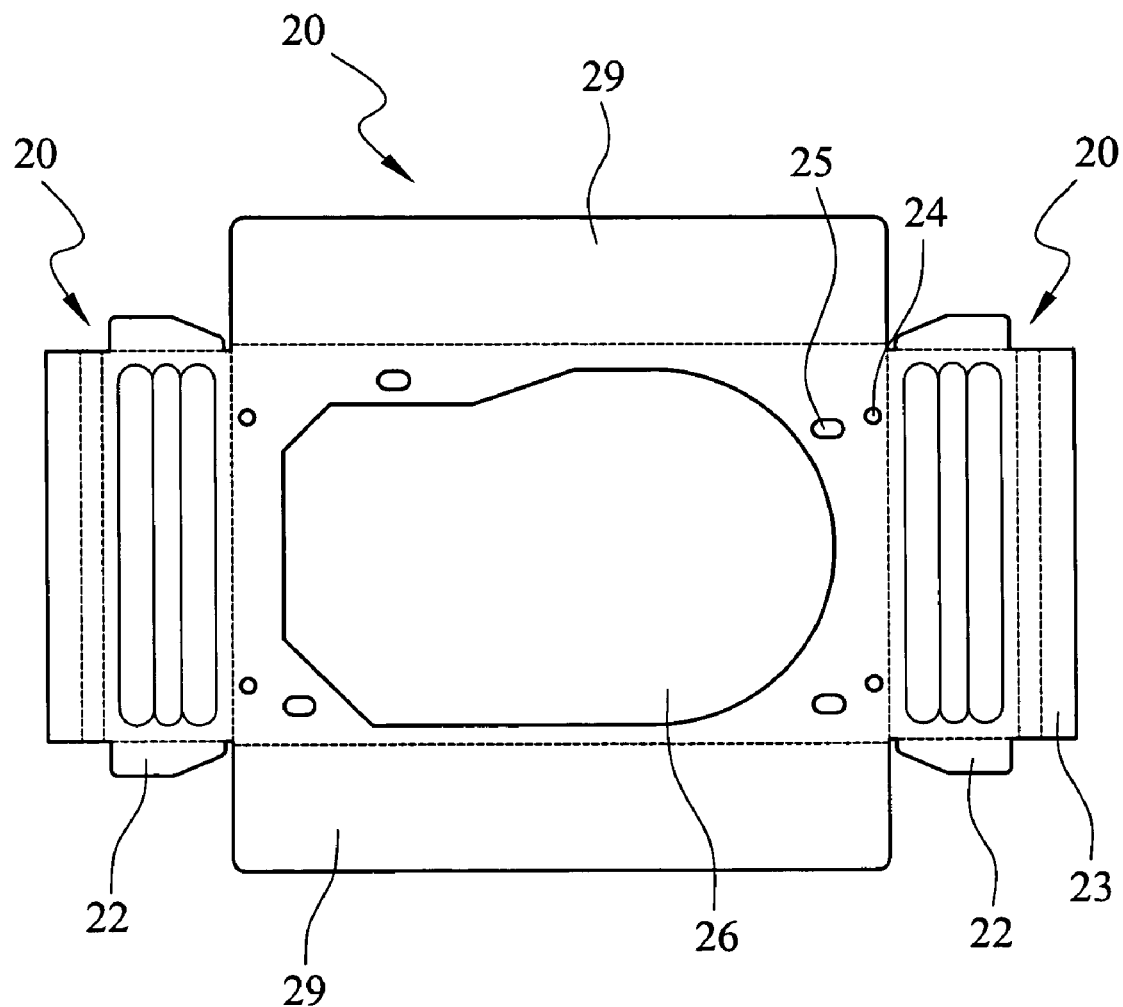
FIG. 3 is a schematic view of the anchor rack of the invention.
Figure 4:
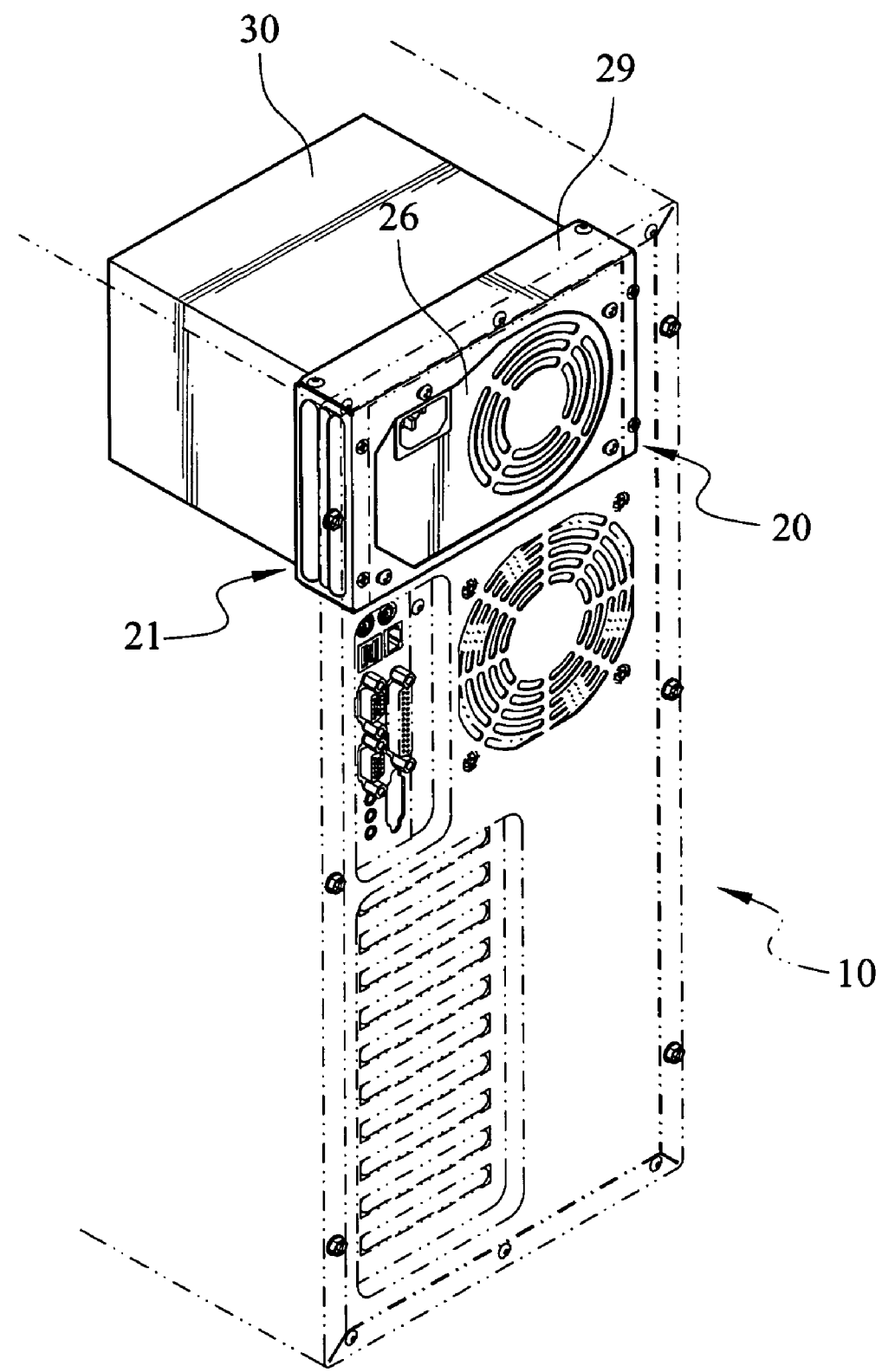
FIG. 4 is a schematic view of the invention in an assembled condition.
Figure 5:
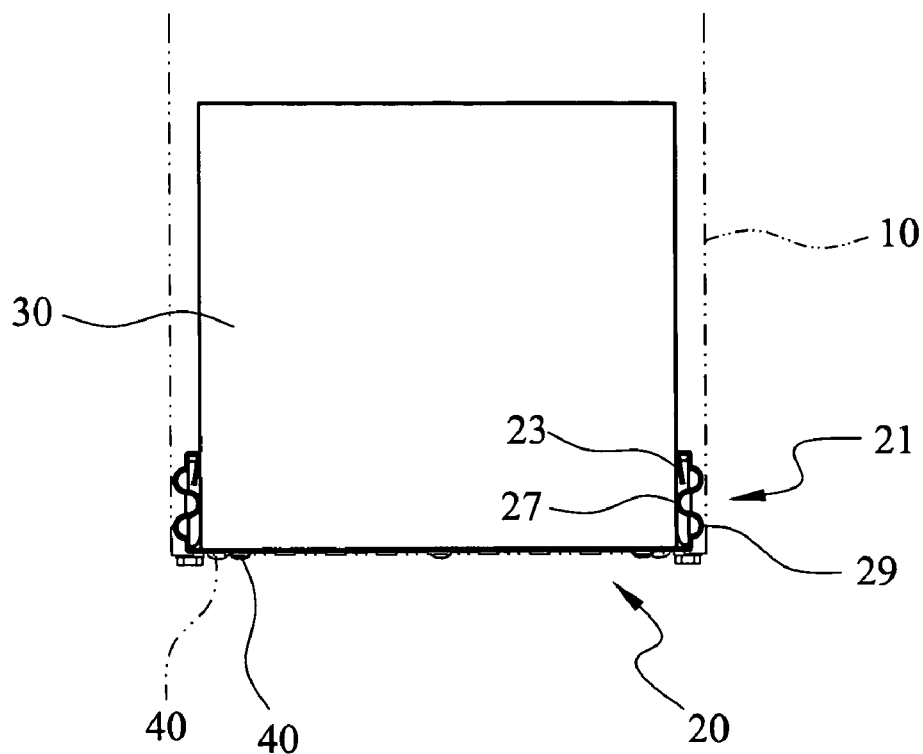
FIG. 5 is a top view of the computer case structure of the invention.
Figure 6:
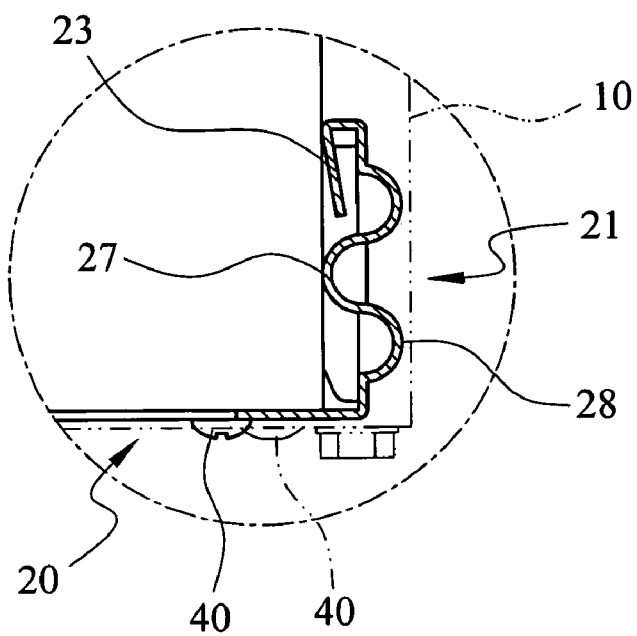
FIG. 6 is an enlarged fragmentary view of the computer case structure of the invention.

Referring to FIGS. 2 through 6, the computer case 10 provided by the invention has a housing compartment 11 for holding various electronic elements such as a mainboard, CPU, various interface cards, hard disk drives and the like (not shown in the drawings). The electronic power required for this computer equipment is provided by a power supply 30, which is held in the housing compartment 11 by an anchor rack 20.

The anchor rack 20 has a face plate having a plurality of apertures 24 and holes 25. The apertures 24 allow screws 40 to pass through and fasten to the computer case 10 so that the anchor rack 20 is fastened to an inner wall of the computer case 10. After being fastened to the computer case 10, the periphery of the anchor rack 20 has force distribution walls 21 extended towards the housing compartment 11. The force distribution walls 21 have a coupling section 22 extended from a distal end in the direction of a neighboring force distributing wall 29. The force distributing walls 21 and 29 are extended from the periphery of the face plate of the anchor rack 20 towards the housing compartment 11 to form a sturdy three-dimensional structure, and coupled together with an external fastening element 50 such as rivet.

The power supply 30 is installed on the anchor rack 20 and fastened by screws 40 running through the holes 25. The force distributing walls 21 and 29 surround a portion of the power supply 30, so they can shield EMI generated by the power supply 30 during operation. Therefore other electronic elements in the housing compartment can function normally. In addition, regardless of whether the computer case 10 is positioned horizontally, vertically or in a tilted manner, the force distributing walls 21 can evenly distribute the weight of the power supply 30 to the computer case 10. It is to be noted that the anchor rack 20 has an opening 26 leading to the housing compartment 11 to expose the power port 31 of the power supply 30. The opening 26 has a curved edge on a portion of the peripheral rim to mate with the air fan of the power supply 30.

In order to enhance the coupling strength of the power supply 30 and the anchor rack 20, the force distributing wall 21 has a first retaining rib 27 extending inwards, a second retaining rib 28 extending outwards, and a clipping section 23 bent on a tail end. When the power supply 30 is installed on the anchor rack 20, the first retaining rib 27 pushes the power supply 30 to create forced coupling between the power supply 30 and the anchor rack 20. Similarly, the second retaining rib 28 presses the computer case 10 to maintain contact between the anchor rack 20 and the computer case 10 so that when the anchor rack 20 receives vibration generated by the power supply 30 during operation, the vibration is transferred to the computer case 10 to produce a damping effect. When the power supply 30 of varying specifications and sizes is installed, the clipping section 23 slightly clips the power supply 30 to provide a buffering effect. Hence vibration noise may be reduced significantly.

The computer case structure of the invention provides improved positioning for the power supply 30 on the computer case 10. The problems of deformation, vibration and noise occurring with the power supply 30 on a conventional computer case are eliminated. EMI is also prevented. With the invention, whether the computer case 10 is positioned horizontally, vertically or in a tilted manner, the weight of the power supply 30 is evenly distributed to the computer case 10 through the force distributing walls 21. Moreover, the force distributing walls 21 can reduce EMI to maintain normal operation of the computer equipment.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A computer case structure, comprising:
   a computer housing having a housing compartment; and
   an anchor rack located in the housing compartment to hold a power supply in the housing compartment, the anchor rack having a face plate, and a plurality of force distributing walls extended from a periphery of the face plate towards the housing compartment to cover a portion of the power supply; the force distributing walls respectively comprising:
   at least a first wall that has a coupling section extended from a distal end thereof in a direction of an adjacent, second wall to allow the first and second walls to be coupled together using an external fastening element;
   a tail end disposed on one of the first and second walls, and being bent to form a clipping section that clips to the power supply;
   a first retaining rib on the one of the first and second walls, the first retaining rib projecting inwards to press against and enhance a clipping effect on the power supply; and
   a second retaining rib on the one of the first and second walls, the second retaining rib projecting outwards to press against the computer housing.

2. The computer case structure of claim 1, wherein the anchor rack has an opening formed in the face plate, and communicating with the housing compartment to expose a power cord located on one side of the power supply.

3. The computer case structure of claim 2, wherein the opening has a portion of a peripheral rim formed in a curved edge to mate with an air fan of the power supply.

4. The computer case structure of claim 1, wherein the anchor rack has a plurality of apertures to receive screws to fasten the anchor rack to an inner wall of the computer case.

5. The computer case structure of claim 1, wherein the anchor rack has a plurality of holes to receive screws to fasten the power supply to the anchor rack.

6. The computer case structure of claim 1, wherein the fastening element is a rivet.

* * * * *